(12) United States Patent
Fujimoto

(10) Patent No.: US 9,122,630 B2
(45) Date of Patent: *Sep. 1, 2015

(54) MEMORY SYSTEM HAVING HIGH DATA TRANSFER EFFICIENCY AND HOST CONTROLLER

(71) Applicant: Kabushiki Kaisha Toshiba, Minato-ku (JP)

(72) Inventor: Akihisa Fujimoto, Yamato (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/588,718

(22) Filed: Jan. 2, 2015

(65) Prior Publication Data

US 2015/0120984 A1 Apr. 30, 2015

Related U.S. Application Data

(63) Continuation of application No. 14/338,038, filed on Jul. 22, 2014, now Pat. No. 8,959,260, which is a continuation of application No. 14/172,995, filed on Feb. 5, 2014, now Pat. No. 8,825,923, which is a (Continued)

(30) Foreign Application Priority Data

Sep. 22, 2010 (JP) ................................. 2010-212721

(51) Int. Cl.
*G06F 3/00* (2006.01)
*G06F 13/00* (2006.01)
*G06F 12/10* (2006.01)
*G06F 13/28* (2006.01)

(52) U.S. Cl.
CPC ............ *G06F 12/1081* (2013.01); *G06F 13/28* (2013.01); *G06F 2213/28* (2013.01)

(58) Field of Classification Search
CPC .................... G06F 2213/28–2213/2808; G06F 13/28–13/30

USPC .......................................................... 710/22
See application file for complete search history.

(56) References Cited

U.S. PATENT DOCUMENTS 7,725,638 B2   5/2010   Zhang et al.
7,827,331 B2   11/2010  Baba et al.
(Continued)

FOREIGN PATENT DOCUMENTS

JP    2005-157717    6/2005
JP    2005-258783    9/2005
WO    WO 2010/074944 A2    7/2010

OTHER PUBLICATIONS

"SD Host Controller Simplified Specification Version 2.00", Section 1.13, "Advanced DMA", SD Specifications Part A2, SD Association, Feb. 8, 2007, © 2002-2007, 20 Pages.

(Continued)

*Primary Examiner* — Titus Wong
(74) *Attorney, Agent, or Firm* — Oblon, McClelland, Maier & Neustadt, L.L.P.

(57) ABSTRACT

According to one embodiment, the host controller includes a register set to issue command, and a direct memory access (DMA) unit and accesses a system memory and a device. First, second, third and fourth descriptors are stored in the system memory. The first descriptor includes a set of a plurality of pointers indicating a plurality of second descriptors. Each of the second descriptors comprises the third descriptor and fourth descriptor. The third descriptor includes a command number, etc. The fourth descriptor includes information indicating addresses and sizes of a plurality of data arranged in the system memory. The DMA unit sets, in the register set, the contents of the third descriptor forming the second descriptor, from the head of the first descriptor as a start point, and transfers data between the system memory and the host controller in accordance with the contents of the fourth descriptor.

5 Claims, 5 Drawing Sheets

Related U.S. Application Data continuation of application No. 13/865,754, filed on Apr. 18, 2013, now Pat. No. 8,683,093, which is a continuation of application No. 13/473,212, filed on May 16, 2012, now Pat. No. 8,447,896, which is a continuation of application No. 13/052,147, filed on Mar. 21, 2011, now Pat. No. 8,195,845.

(56) References Cited

U.S. PATENT DOCUMENTS

2009/0216937 A1    8/2009    Yasufuku
2010/0017650 A1    1/2010    Chin et al.
2010/0125698 A1    5/2010    Fujimoto
2011/0276730 A1    11/2011    Lin et al.

OTHER PUBLICATIONS

Office Action issued on Mar. 21, 2014 in Taiwan Patent Application No. 100108381 (with English Translation).

Office Action issued Jun. 17, 2014 in Japanese Patent Application No. 2011-086523 (with English Translation).

Office Action mailed Oct. 28, 2014 in Japanese Application No. 2011-086523 (w/English translation).

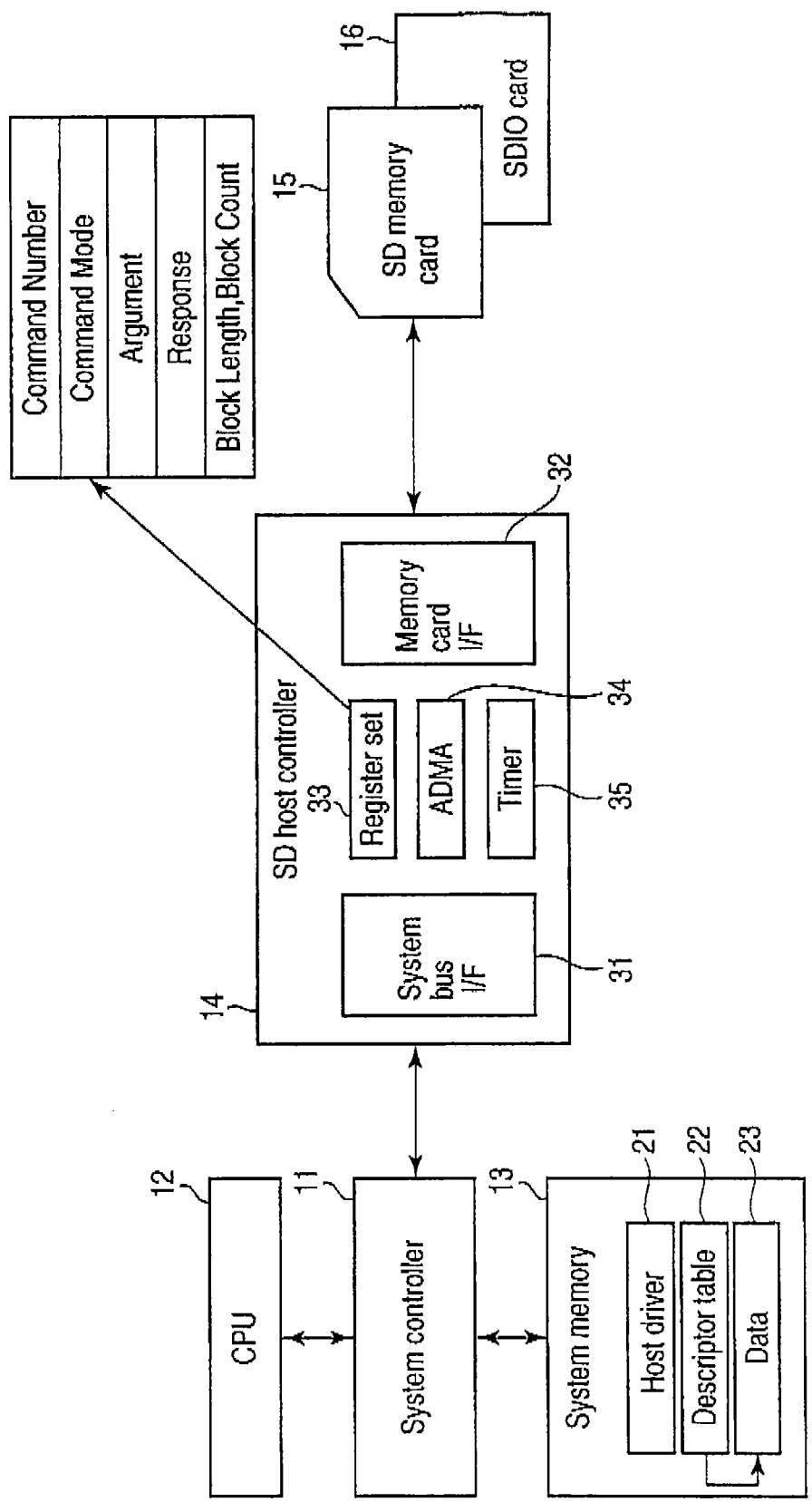
F I G. 1

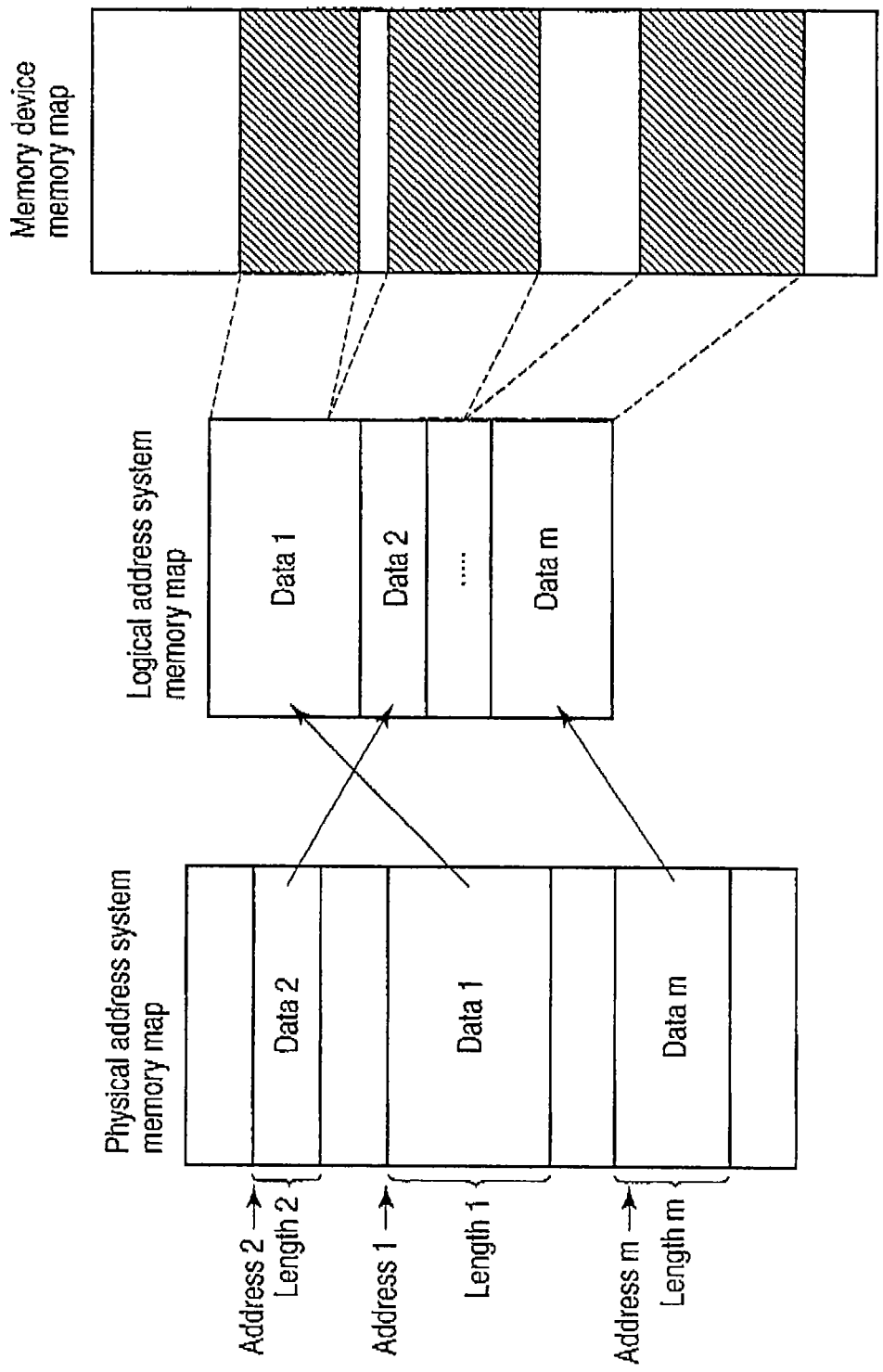
F I G. 2

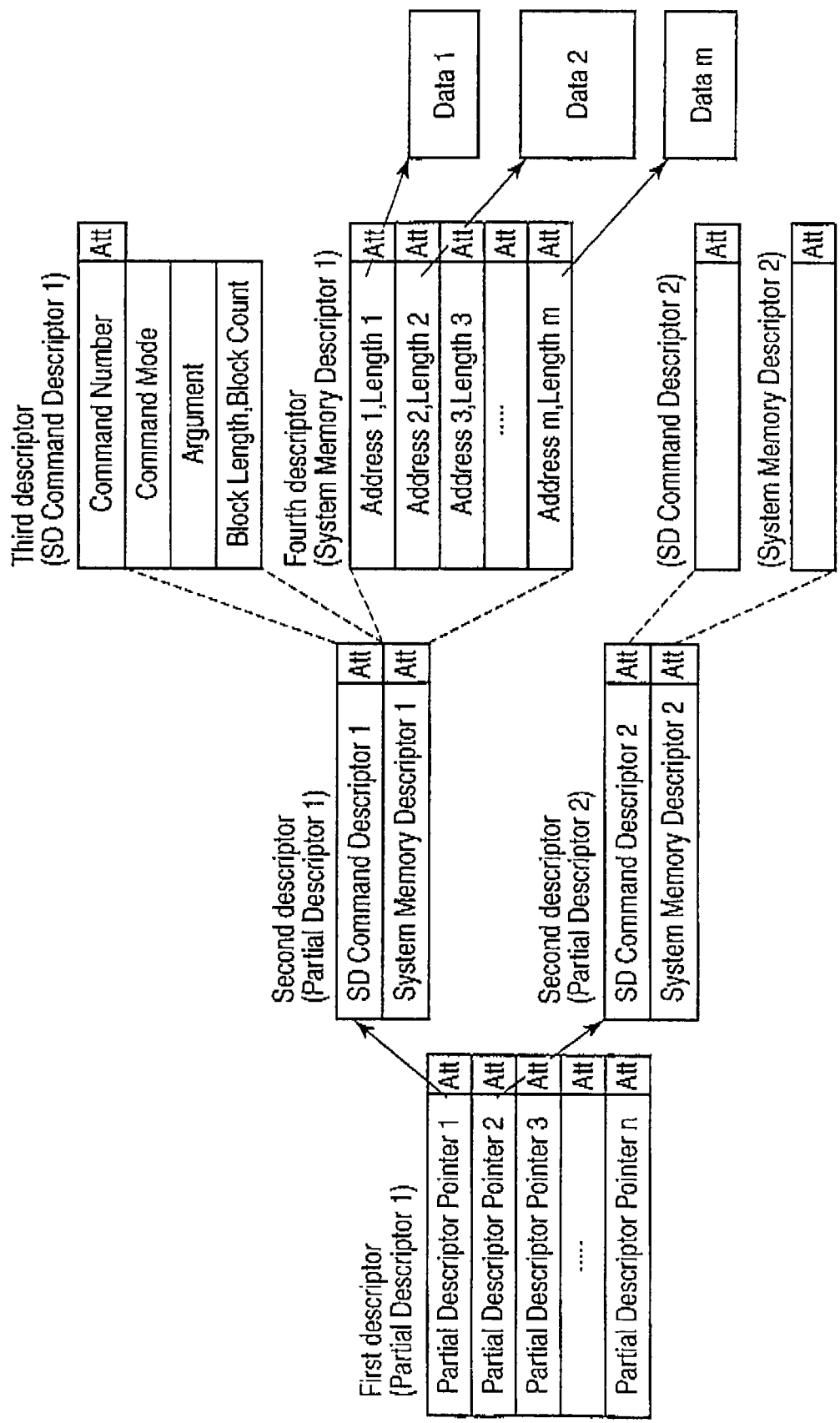
F I G. 3

MEMORY SYSTEM HAVING HIGH DATA TRANSFER EFFICIENCY AND HOST CONTROLLER

CROSS-REFERENCE TO RELATED APPLICATIONS

This application is a continuation of and claims the benefit of priority under 35 U.S.C. §120 from U.S. Ser. No. 14/338,038 filed Jul. 22, 2014, which is a continuation of U.S. Ser. No. 14/172,995 filed Feb. 5, 2014 (now U.S. Pat. No. 8,825,923 issued Sep. 2, 2014), which is a continuation of Ser. No. 13/865,754 filed Apr. 18, 2013 (now U.S. Pat. No. 8,683,093 issued Mar. 25, 2014), which is a continuation of U.S. Ser. No. 13/473,212 filed May 16, 2012 (now U.S. Pat. No. 8,447,896 issued May 21, 2013), which is a continuation of U.S. Ser. No. 13/052,147 filed Mar. 21, 2011 (now U.S. Pat. No. 8,195,845 issued Jun. 5, 2012), and claims the benefit of priority under 35 U.S.C. §119 from Japanese Patent Application No. 2010-212721 filed Sep. 22, 2010, the entire contents of each of which are incorporated herein by reference.

FIELD

Embodiments described herein relate generally to a host controller and memory system to be applied to, e.g., a SD™ card, and supporting advanced direct memory access (ADMA).

BACKGROUND

Recently, SD cards such as SD memory cards are widely used in, e.g., cell phones and digital still cameras as host devices. This SD card is connected to a host device via a host controller, and the host controller controls data transmission between the host device and SD memory card.

BRIEF DESCRIPTION OF THE DRAWINGS

FIG. 1 is a schematic view showing the arrangement of a memory system according to an embodiment;

FIG. 2 is a schematic view showing the memory maps of a system memory and memory card;

FIG. 3 is a view showing the structure of a descriptor according to the embodiment;

DETAILED DESCRIPTION

Figure 4:
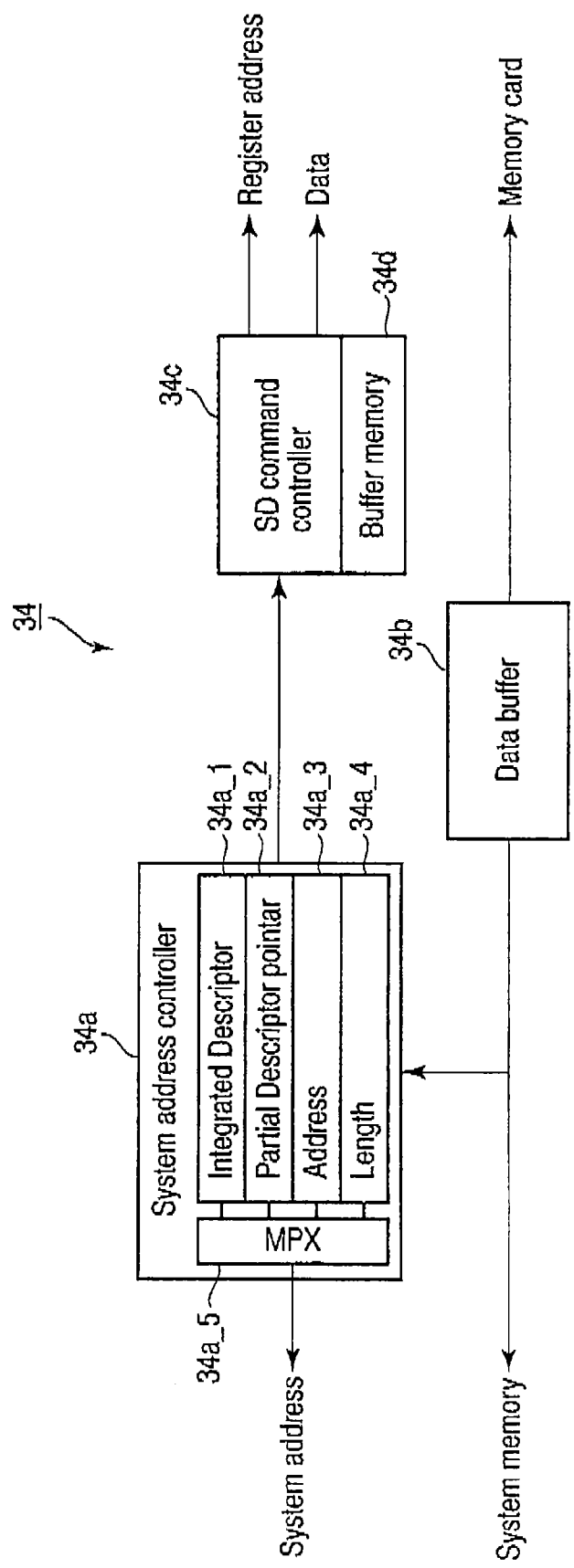
FIG. 4 is a schematic view showing the arrangement of ADMA shown in FIG. 1.

A system memory installed in a host device is managed by paging. Therefore, data in the system memory is fragmentarily managed page-by-page.

To efficiently perform data read/write to a memory card, a host controller supports DMA algorithm capable of data transfer managed page-by-page. That is, data fragmented in the system memory can be transferred by DMA by using a descriptor as a data transfer list.

Unfortunately, conventional DMA algorithm generates an interrupt in order to generate a new system address in the boundary between pages. This disturbs the operation of a CPU. ADMA has been developed in order to eliminate this problem.

ADMA has a function of transferring data to fragmented data areas in the system memory by paging, in accordance with one read/write command of an SD card. Accordingly, ADMA controls data transfer between the host controller and system memory without any interrupt to the CPU by loading the descriptor in the system memory. A host driver controls the issue of a command to the memory card by setting a register set in the host controller, thereby controlling data transfer between the host controller and memory card, and interruption to the CPU has been used. This method poses no problem when the bus performance is low as in a conventional memory.

As the bus performance improves and high-speed data transfer becomes possible in recent years, however, the processing of the host driver generates an overhead. Since it is not always possible to continuously use the area of the memory card, a memory command must be divided into a plurality of memory commands. To control command issue to the memory card by the host driver, the host driver must be executed by causing the host CPU to generate an interrupt midway along data transfer. Therefore, it takes a certain time to respond to the interrupt. This deteriorates the performance because of the influence of the waiting time of the driver processing even when using a high-speed bus.

Accordingly, demands have arisen for a method of efficiently performing data transfer by making it possible to execute, by DMA, the processing requiring the host driver during data transfer.

Embodiment

In general, according to one embodiment, a memory system includes a host controller and DMA unit. The host controller includes a register set configured to control command issue to a device, and a direct memory access (DMA) unit configured to access a system memory, and controls transfer between the system memory and the device. First, second, third and fourth descriptors are stored in the system memory. The first descriptor includes a set of a plurality of pointers indicating a plurality of second descriptors. Each of the second descriptors comprises the third descriptor and fourth descriptor. The third descriptor includes a command number, a command operation mode, and an argument as information necessary to issue a command to the device, and a block length and the number of blocks as information necessary for data transfer. The fourth descriptor includes information indicating addresses and sizes of a plurality of data arranged in the system memory. The ADMA unit sets, in the register set, the contents of the third descriptor forming the second descriptor, from the head of the first descriptor as a start point, and loads and transfers data from the system memory in accordance with the contents of the fourth descriptor.

The embodiment will be explained below with reference to the accompanying drawing. The ADMA described below is an ADMA improved by the embodiment.

FIG. 1 schematically shows the memory system according to this embodiment.

This embodiment makes it possible to issue SD commands by a host controller during DMA transfer by extending a descriptor capable of data transfer of a system memory, thereby reducing the overhead caused by host driver processing.

A system controller 11 shown in FIG. 1 controls interfaces with a CPU 12, system memory 13, and SD controller 14.

The system memory 13 stores a host driver 21, descriptor table 22, and data 23. An operating system (OS) secures areas required to store the host driver 21, descriptor table 22, and data 23 in the system memory 13.

The host driver 21 is a driver provided for, e.g., the SD host controller 14 and unique to the OS, and is executed by the CPU 12. The host driver 21 generates the descriptor table 22 before executing ADMA (to be described later). The descriptor table 22 is a list of information necessary for data transfer between the system memory 13 and an SD card, and is described by format which can be interpreted by the SD host controller. The structure of the descriptor table 22 will be described later.

The SD host controller 14 has a function of bidirectionally transferring data between the system memory 13 and an SD card by using SD commands. The SD host controller 14 mainly includes a system bus interface circuit 31, a memory card interface circuit 32, a register set 33 including a plurality of registers, an ADMA 34, and a timer 35.

The system bus interface circuit 31 is connected to the system controller 11 via a system bus. The memory card interface circuit 32 is connectable to SD cards, e.g., an SD memory card 15 and SDIO card 16, via an SD bus interface (not shown). The SD bus interface is not limited to 4-bits type, but can be applied to e.g. UHS (Ultra High Speed)-II using LVDS (Low Voltage Differential Signaling) system. In UHS-II, commands are transferred in packet form.

The register set 33 of the SD host controller 14 is classified into a plurality of units (not shown) such as an SD command generation unit, response unit, buffer data port unit, host control unit, interrupt control unit, and ADMA unit. Information such as a command number, command mode, and argument necessary to issue an SD command and information such as a block length and the number of blocks necessary to transfer data are set in the SD command generation unit of the register set 33. When these pieces of information are set, the SD command generation unit issues a command to an SD card. The response unit in the register set 33 receives a response supplied from the SD card in response to the command.

The ADMA 34 is a circuit for transferring data between an SD card and the system memory 13 without any intervention of the CPU 12. The ADMA 34 executes data transfer in accordance with contents described in the descriptor table 22 in the system memory 13.

The timer 35 detects a timeout error. For example, the timer 35 detects a timeout error if the operation of a read command is not complete within a time set from the issue to the end of the read command. The CPU 12 is notified of this timeout error by an interrupt, and the timeout error is processed by the host driver.

FIG. 2 shows an example of the relationship between paging management of the system memory 13 and SD physical addresses. The system memory 13 is managed by paging for each small area, e.g., a 4-Kbyte area. An application executed by the host CPU 12 accesses the system memory 13 by a logical address by using a paging function managed by the host CPU 12. As indicated by a logical address system memory map, therefore, data are apparently arranged in a continuous address area. However, positions in the system memory 13 in which data are actually recorded are arbitrary, and fragmented as indicated by a physical address system memory map. These data are managed by the addresses and data lengths. The data length is variable. Also, the relationship between the physical address and logical address of data stored in the system memory 13 is managed by a page table (not shown).

On the other hand, data stored in the SD memory card 13 are managed for each page (each block) having, e.g., 512 bytes to a few Mbytes, and completely independent of the system memory 13. When data in the system memory 13 is to be stored in the SD memory card 15, therefore, as indicated by an SD physical address memory map, the data in the system memory 13 is stored by a size different from that in the system memory 13. Data in the SD memory card 15 is held in continuous memory area designated for each command and has an address designated by the command. The data length is variable and is designated by the other command.

DMA transfer directly accesses the system memory 13 by the physical address. Accordingly, DMA can be executed by forming a descriptor as a transfer list in the system memory 13.

FIG. 3 shows a descriptor according to this embodiment. This descriptor is formed in the descriptor table 22 of the system memory 13.

The descriptor of this embodiment extends a conventional descriptor and has a hierarchical structure. When using the descriptor of this embodiment, data transfer performed between the system memory 13 and SD memory card 15 by ADMA is completely executable by hardware. This obviates the need to interrupt the host CPU 12 during data transfer. Although an error processing request is notified by an interrupt, no problem arises because the probability of its occurrence is very low.

As shown in FIG. 3, a first descriptor (integrated descriptor) is a set of pointers to a plurality of second descriptors (partial descriptors).

Each second descriptor (partial descriptor) is a pair of a third descriptor (SD command descriptor) and a fourth descriptor (system memory descriptor).

The contents of the third descriptor are formed by information for issuing an SD command. That is, the contents of the third descriptor are formed by, e.g., a command number, a command mode, an argument, and a block length and the number of blocks as information necessary for data transfer. The command mode indicates, e.g., read/write. One SD command is issued by writing the third descriptor in the SD command generation unit of the register set 33 of the SD host controller 14.

The contents of the fourth descriptor (system memory descriptor) are formed by an address indicating the position of each data in the system memory 13, and a length indicating the data length, and indicate a set of a plurality of fragmented data.

Since the third descriptor corresponds to one of read/writ commands, one continuous region of the SD memory card can be designated. As shown in FIG. 2, when the memory region is divided into two or more regions, each of the regions needs the third descriptor. Therefore, the fourth descriptor corresponding to the third descriptor is programmed to the same data length as that of each third descriptor.

The first to fourth descriptors each have attribute information Att. Each attribute information Att contains, e.g., information for identifying the type of descriptor, and an end bit indicating the end position of the descriptor.

Note that the third descriptor has a format different from that of the other descriptors, so the attribute information Att may be provided in accordance with at least the first command number. Moreover, the attribute information Att may be provided with each line the same as another descriptor.

FIG. 4 shows an outline of the arrangement of the ADMA 34. The ADMA 34 includes a system address controller 34a, data buffer 34b, SD command controller 34c, and buffer memory 34d.

The system address controller 34a manages addresses in the system memory 13. More specifically, the system address controller 34a manages the load of the first to fourth descriptors stored in the system memory 13. That is, the start address of the first descriptor (integrated descriptor) is set in the system address controller 34a as initial value. Thereby, the system address controller 34a is able to read information of the first descriptor from the memory 13. Since pointers of each of the second descriptors are described in the first descriptor, the system address controller 34a reads an address of the second descriptor designated by each of the pointers and reads the second descriptor in accordance with the address. Then, the system address controller 34a transfers an SD command descriptor as the third descriptor forming the second descriptor to the SD command controller 34c. In addition, the system address controller 34a sequentially loads the address and data length of data described in the fourth descriptor forming the second descriptor. In accordance with the loaded address and data length, the system address controller 34a reads data from the system memory 13 and transfers the data to the data buffer 34b when performing memory write. When performing memory read, the system address controller 13a transfers data from the data buffer 34b to the system memory 13.

To execute these operations, the system address controller 34a includes a plurality of registers 34a_1 to 34a_4, and a multiplexer (MPX) 34a_5 for selecting output signals from these registers, in order to hold the start address of the first descriptor (integrated descriptor), the pointer of the second descriptor (partial descriptor), and the address and data length of data.

The SD command controller 34c sequentially generates register addresses for setting values in the SD command generation unit, and sequentially sets, in the SD command generation unit of the register set 33 of the host controller 14, register setting information contained in an SD command descriptor as the third descriptor. When the setting of the registers is complete, the SD command generation unit of the register set 33 issues an SD command.

In memory write, the buffer memory 34d loads data in the system memory 13, which is designated by the system address controller 34a, and temporarily holds the supplied data. The data held in the data buffer 34b is transferred to the SD memory card 15 in synchronism with an issued SD command.

In memory read, the buffer memory 34d temporarily holds data loaded from the SD memory card 15 as a memory device in synchronism with an issued SD command, and transfers the data to a position in the system memory 13, which is designated by the system address controller 34a.

Figure 5:
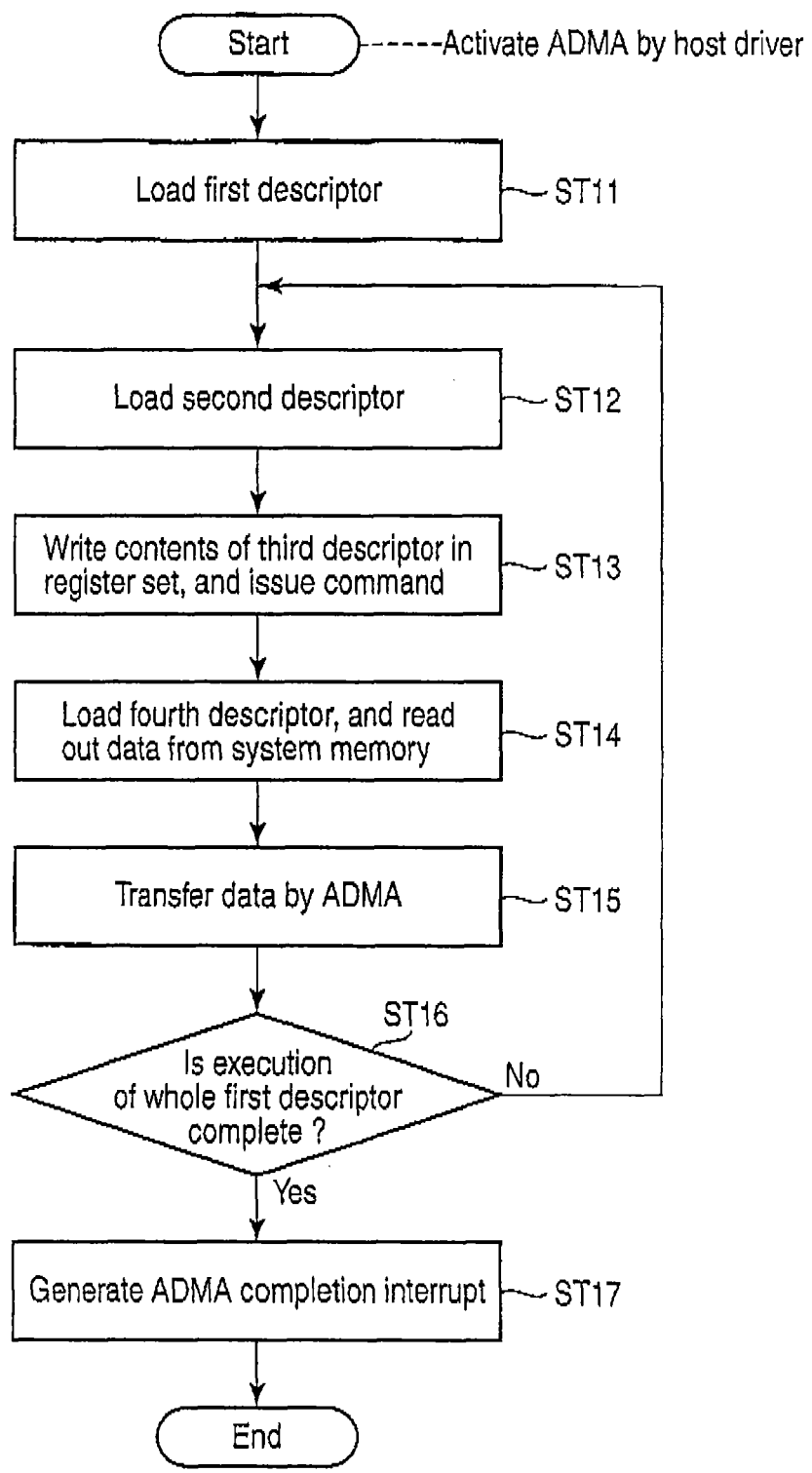
FIG. 5 is a flowchart showing the operation of ADMA.

The operation of the ADMA 34 using the extended descriptor in the above-mentioned configuration will be explained below with reference to FIG. 5.

To perform data transfer between the system memory 13 and SD memory card 15, the host driver 21 forms the extended descriptor as shown in FIG. 3 in the system memory 13. The host driver 21 sets the start address of the first descriptor in register 34a_1 of the system address controller 34a.

When the host driver 21 activates the ADMA 34 after that, the system address controller 34a loads a second descriptor pointer (partial descriptor pointer) described at the head of the first descriptor (integrated descriptor), based on the start address of the first descriptor held in register 34a_1, and holds the second descriptor pointer in register 34a_2 (ST11).

Then, the system address controller 34a loads a second descriptor in the location indicated by the second descriptor pointer (ST12).

The third descriptor (SD command descriptor) described at the head of the second descriptor is supplied to the SD command controller 34c. The SD command controller 34c writes data described in the third descriptor, in the SD command generation unit forming the register set 33 of the SD host controller 14. Consequently, the SD command generation unit issues a command to the SD memory card 15 (ST13).

Subsequently, the system address controller 34a loads the fourth descriptor (system memory descriptor). The system address controller 34a holds the address and data length described in the fourth descriptor, in register 34a_3 (address) and register 34a_4 (length), respectively. In memory write, the system address controller 34a reads data from the system memory 13 by using the address in register 34a_3 (address) as the start address, and transfers the read data to the data buffer 34b. In memory read, the system address controller 34a writes data of the data buffer 34b in the system memory 13 by using the address in register 34a_3 (address) as the start address (ST14).

In memory write, fragmented data supplied from the system memory 13 are combined into continuous data in the data buffer 34b. The fourth descriptor (system memory descriptor) is made up of a plurality of data each formed by a pair of the address and data length, and the ADMA performs data transfer between the system memory and data buffer 34b by repeating this.

After that, the ADMA transfers the data held in the data buffer 34b to the SD memory card 15 (ST15). The ADMA accesses data in the system memory 13 in synchronism with an issued command (read/write command), and data transfer between the memory and card is executed via the data buffer 34b by synchronizing them. The total data transfer amounts on the memory device side and system memory side must be set at the same value.

When data transfer based on one second descriptor is complete, whether the execution of the whole first descriptor is complete is determined (ST16). If the execution of the whole first descriptor is not complete, the control returns to step ST12, the next second descriptor is loaded in accordance with the partial descriptor pointer described in the first descriptor, and the above operation is executed (ST16-ST12). Each descriptor has the end bit in the above-mentioned attribute information Att, and the end position of the descriptor program can be designated by this end bit.

When the third descriptor is set in the register of the SD host controller 14 in accordance with the next second descriptor, an SD command is issued, and data is transferred in accordance with the fourth descriptor. In memory read, for example, after final data is transferred to the data buffer 34b, it is also possible to issue the SD command of the next transmission during DMA transfer to the system memory by reading the following third descriptor. In this case, the operation speed can further be increased because the command issuing time is hidden.

On the other hand, if all the contents described in the first descriptor have been executed, the SD host controller 14 generates an ADMA completion interrupt (ST17). This allows the CPU 12 (host driver 21) to know the normal termination of the ADMA processing. If no error occurs, the host CPU 12 need not participate in transfer from the activation to the termination of the ADMA, so the host driver does not deteriorate the performance. In addition, the descriptor formation time has no influence on the transfer performance because the next descriptor can be prepared during data transfer.

A file system is instructed by the host driver to update information, when the transmission is completed. Thereby, the data transferred to the SD memory card is decided.

In the above embodiment, the host driver 21 generates the extended descriptor in the system memory 13 in order to perform data transfer between the system memory 13 and SD memory card 15. This extended descriptor includes the first descriptor as a set of pointers indicating the positions of the second descriptors. When the host driver 21 activates the ADMA 34, the ADMA 34 sequentially loads the contents of the second descriptors based on the contents of the start address of the first descriptor, and executes data transfer between the system memory 13 and SD memory card 15 in accordance with the contents of the third and fourth descriptors described in the second descriptors. Therefore, the host driver 21 does not participate in data transfer executed by the ADMA 34. This enables the ADMA 34 to perform high-speed data transfer.

Also, after being activated, the ADMA 34 generates a command by setting the third descriptor in the SD command generation unit of the register set 33, and can execute data transfer between the system memory 13 and SD memory card 15 by using hardware alone. This makes the operation speed much higher than that when the host driver 21 intervenes in the operation.

Furthermore, to operate the host driver during data transfer, the host driver is normally activated by an interrupt. Accordingly, the data transfer performance deteriorates if the interrupt response time is not negligible. However, the method of this embodiment can avoid the performance deterioration like this.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A host controller which is connected to a memory device through an interface, accesses a system memory, and is controlled by a CPU executing a host driver, wherein each of first, third, and fourth descriptors has an attribute field for identifying a type of the descriptors, and designating a processing method of the descriptors, the host controller comprising:
    a register set which is configured to store a part of information in the third descriptor;
    a command controller which is configured to issue a command to the memory device according to the information stored in the register set; and
    a direct memory access (DMA) unit which is configured to load the first, third, and fourth descriptors into the host controller, and is configured to transfer data between the system memory and the memory device according to the first, third, and fourth descriptors,
    wherein the first descriptor includes a plurality of pointers with attributes,
    each of the pointers of the first descriptor indicates a leading region of the third descriptor,
    the third descriptor includes command issue information and attributes,
    the fourth descriptor includes a number of DMA execution information and attributes,
    wherein the DMA unit is configured (1) to load the first descriptor, (2) to acquire the pointer from the loaded first descriptor, (3) to load the third descriptor and the fourth descriptor based on the acquired pointer, (4) to execute a data transfer between the system memory and the memory device, (5) to repeat the process of (2) to (4) until the attribute of the first descriptor indicates the end of descriptor, and (6) to generate an interrupt to the CPU when the data transfer is end or during a DMA data transfer,
    wherein the third descriptors includes information to generate a data transfer command of the memory device, a command argument, a command number, a block length, and the number of blocks,
    wherein the fourth descriptor includes information to designate system memory areas addresses, and sizes for each of a plurality of scattered data in the system memory, and
    wherein the DMA unit includes:
    a system address controller configured to control addresses of the system memory pointing data and each descriptor, and
    a data buffer,
    wherein the data in the system memory is read to the data buffer in accordance with the fourth descriptor, and the data in the data buffer is transferred to the memory device in accordance with the third descriptor when the data is written into the memory device, and
    the data in the memory device is read to the data buffer in accordance with the third descriptor, and the data in the data buffer is transferred to the system memory in accordance with the fourth descriptor when the data is read from the memory device.

2. The host controller according to claim 1, wherein the fourth descriptor is programmed so that a sum of sizes of a plurality of scattered data equals to the block length indicated in the third descriptor.

3. The host controller according to claim 1, wherein the data transfer between the host controller and the memory device is started by a memory read/write command which is issued by command controller when setting information of the third descriptor to the register set is completed, and
    the memory device acquires information necessary for the data transfer from the command.

4. A method for transferring data between a memory device and a system memory executed by a host controller, the system memory storing first, third, and fourth descriptors, the method comprising:
    (1) loading the first descriptor including a plurality of pointers with attributes;
    (2) acquiring a pointer from the loaded first descriptor, wherein the pointer indicates a leading region of the third descriptor;
    (3) loading the third descriptor based on the pointer to issue a command, wherein the third descriptor includes command issue information and attributes;
    (4) issuing a command according to the loaded third descriptor;
    (5) loading the fourth descriptor based on the pointer, wherein the fourth descriptor includes a number of DMA execution information and attributes;
    (6) when the issued command is a read-command, reading data from the system memory to a data buffer in accordance with the fourth descriptor and transferring the data from the data buffer to the memory device in accordance with the third descriptor;
    when the issued command is a write-command, reading data from the memory device to the data buffer in accordance with the third descriptor, and transferring the data from the data buffer to the system memory in accordance with the fourth descriptor;
    (7) repeating (2) to (6) until an attribute of the first descriptor indicates the end of descriptor; and (8) generating an interrupt when a data transfer is end or during a DMA data transfer, wherein the third descriptor includes information to generate a data transfer command of the memory device, a command argument, a command number, a block length, and the number of blocks, wherein the fourth descriptor includes information to designate system memory areas addresses, and sizes for each of a plurality of scattered data in the system memory.

5. The method according to claim 4, wherein the first, third, and fourth descriptors includes:

information for indicating the type of descriptor; and an end bit indicating the last descriptor for each of the first, third, and fourth descriptors.

* * * * *